June 24, 1930.  W. W. NUGENT  1,768,139
FILTERING SYSTEM FOR LUBRICANTS
Filed July 23, 1924   2 Sheets-Sheet 1
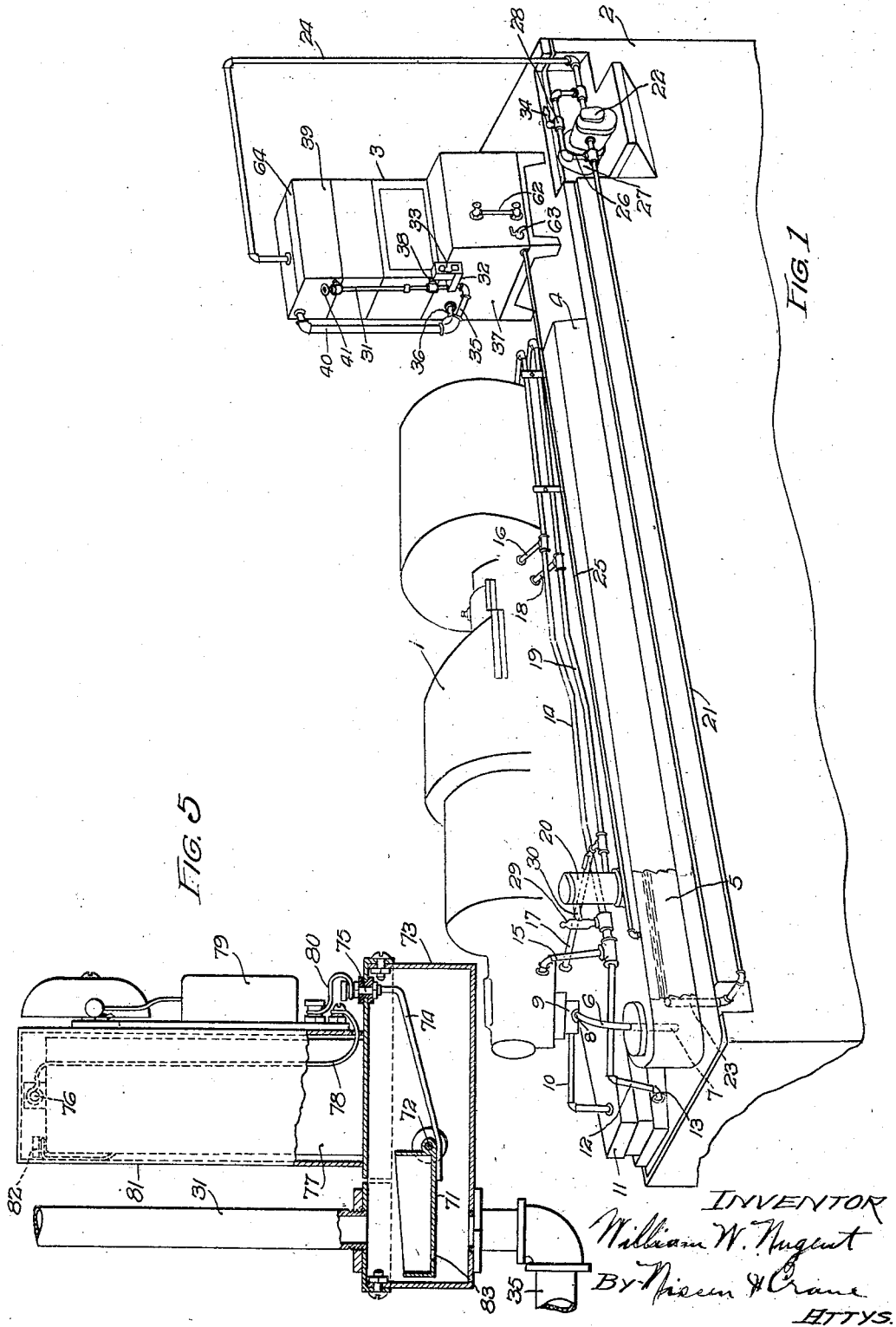

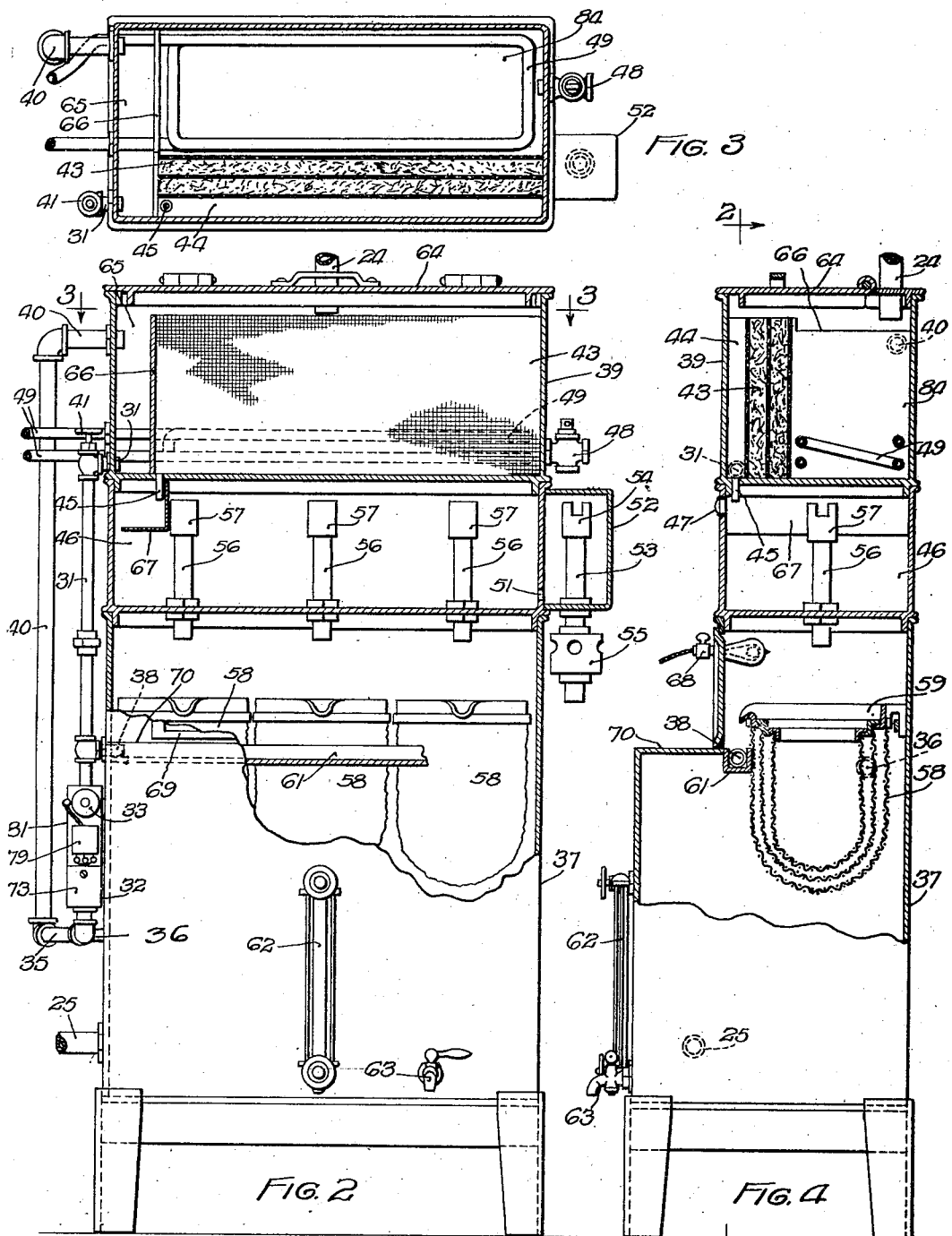

Patented June 24, 1930

1,768,139

UNITED STATES PATENT OFFICE

WILLIAM W. NUGENT, OF CHICAGO, ILLINOIS

FILTERING SYSTEM FOR LUBRICANTS

Application filed July 23, 1924. Serial No. 727,605.

My invention relates to improvements in filtering systems for lubricants, one of the objects being the provision of an improved filtering system for removing impurities and water from used oil and to re-circulate the same through the bearings of the engine, such as a turbine engine, or any other mechanism that requires lubrication.

Another object of the invention is the provision of apparatus to remove a portion of the used oil from an oil reservoir of a lubricating system and to purify and return the same to said reservoir.

A further object of my invention is the provision of a filtering system for lubricants to be used in connection with an engine or turbine and to be positioned on the extended base of said engine or turbine.

A still further object of my invention is the provision of means to pump used lubricating material from a reservoir to a filtering device wherein said used lubricant is purified and to return said purified lubricating material to said reservoir.

Other objects will appear hereinafter, the novel features and combinations being set forth in the appended claims.

In the accompanying drawings—

Fig. 1 represents a perspective view of a steam turbine equipped with my improved lubricating system including automatic filtering mechanism of an improved type;

Fig. 2 is a perspective elevational view, partly in section, of the preferred type of filtering apparatus for use in the system shown in Fig. 1;

Fig. 3 is a plan view of the filtering apparatus shown in Fig. 2;

Fig. 4 is a side elevation in section of the filtering apparatus shown in Fig. 2; and Fig. 5 is a detail view of the automatic overflow alarm mechanism shown in Figs. 1 and 2.

Referring to Fig. 1 of the accompanying drawings, it will be seen that a steam turbine is diagrammatically shown at 1 positioned on a concrete base 2, said base being extended so as to support the filtering device 3. The turbine 1, as shown, is mounted on a base 4 having therein an oil reservoir 5.

One wall of the oil reservoir 5 is broken away in Fig. 1 to disclose the interior of said reservoir and the pipes communicating with the same. It will be seen that a pipe 6 having an intake opening 7 at one end extends into the reservoir 5 and is connected at its other end 8 to an oil pump 9. The open end 7 of the pipe 6 is immersed in the oil in the reservoir 5, said pipe 6 being adapted to act as a suction pipe to convey the lubricant from the reservoir 5 to the oil pump 9.

The lubricant is delivered from the pump 9 through a pipe 10 to a cooler 11. A pipe 12 is secured to the outlet 13 of the cooler 11 and delivers the cooled oil to a main supply pipe 14. A plurality of branch pipes, such as pipes 15 and 16, lead from the main supply pipe 14 and direct lubricant to the bearings and all the moving parts of the turbine. A relief valve 29 disposed between two successive lengths of the main supply pipe 14 is adapted to discharge oil through a pipe 30 into the oil dome or filtering pot 20 when the pressure in said main supply pipe exceeds a predetermined degree. A plurality of return branch pipes, such as pipes 17 and 18, are provided to convey the used oil from the bearings and other moving parts of the turbine to a main return pipe 19. It will be seen that the main return pipe 19 communicates with the oil dome 20 positioned above the oil reservoir 5, said oil receiver 20 being adapted to discharge the used oil into the oil reservoir 5. Thus it should be understood that oil is pumped from the reservoir 5, through the cooler 11 and the main supply pipe 14 to the bearings and moving parts of the turbine, and that said oil after being used is returned to the reservoir 5 through the main return pipe 19. The foregoing refers to an old and well-known circulating lubricating system of a turbine engine and is disclosed to illustrate the combination of my improvements thereto.

My improvement provides means whereby a fractional portion of the used oil is removed from the reservoir 5, conveyed to the filtering and water separating device 3, and after being separated from water and solid impurities returned to said oil reservoir 5 in the bed of the engine without interfering with the lubricating system of the engine. A pipe 21 extends into the reservoir 5 from below and communicates with a pump 22 mounted in position to receive the oil with the assistance of gravity. The pump 22 driven by a motor 27 draws the used oil from the reservoir 5 into the pipes 21 through the open end 23 positioned within the oil reservoir 5 and forces said oil up the pipe 24 into the filtering device 3. The cleaned oil flows from the filtering device 3 through the pipe 25 into the reservoir 5. Thus it will be seen that oil is continually being supplied to the turbine from the reservoir 5 while some of the oil in the reservoir is continually being cleaned and returned to said reservoir. It should be noted that the filtering device is connected in parallel with the lubricating apparatus and that the latter may be operated independently of the filtering device when desired.

A bypass pipe 26 is provided around the motor driven pump 22 and is equipped with an adjustable hand-operated valve 28 for the purpose of regulating the quantity of oil pumped from the reservoir 5. The bypass pipe 26 is provided to permit some of the oil to re-circulate to and through the pump 22 and thus to reduce the quantity of oil removed from the reservoir 5. When the adjustable valve 28 is closed by the handle 34 all of the oil drawn from the reservoir 5 is forced directly up into the top of the filtering device 3 and the rate at which said oil is removed from said reservoir is comparatively rapid. When the valve 28 is wide open considerable oil is re-circulated through the pump 22 and the capacity of the same is satisfied without removing a comparatively large quantity of oil from the reservoir 5. By adjusting the valve 28 it is possible to regulate the rate of flow of oil to the filtering device 3 and thus to predetermine the number of complete filtering cycles per unit of time. The greater the amount of lubricant needed in the lubricating system of the engine, the greater the amount of oil to be drawn from the reservoir 5 and sent through the filter 3.

The valve 28 may also be employed to prevent the overflow of oil in the upper compartment of the filtering device. It is evident that all filtering devices ultimately become filled with sediment and dirt and at such times the filtering operation is comparatively slow. Thus in the event that the filtering device becomes partly incapacitated, a slight adjustment of the valve 28 would relieve the situation and prevent the wasteful overflow of oil.

The filtering apparatus 3 is equipped with overflow alarm mechanism comprising a bypass 31 connected to the alarm mechanism 32 comprising an electric bell 33. When the filter in the uppermost section of the filter becomes clogged and overflows, as hereinafter more fully pointed out, the oil passes down the pipe 31 to operate the automatic alarm and after being used in the latter the oil passes through the pipe 35 to the intake opening 36 and thence into the lower section or oil reservoir of the filter apparatus 3. A branch pipe is connected at 38 to the pipe 31 to effect operation of the alarm when the filter elements in an intermediate section of the filter become clogged and overflow. It will thus be seen that when the filtering mechanism becomes inoperative the attendant is immediately notified by the alarm mechanism that his attention is required.

When the flow of oil from the pump 22 through the pipe 24 exceeds the capacity of the filtering apparatus the uppermost compartment 39 may overflow into the bypass pipe 40 which is preferably of larger internal diameter than that of the pipe 31. The upper end of the pipe 31 communicates with the bottom portion of a compartment in the top section 39 while the upper end of the pipe 40 communicates with the upper portion of the same compartment. If oil flows through the pipe 31 to the alarm mechanism operation of the latter it may be discontinued by the attendant closing the valve 41 thereby stopping flow of oil into the pipe 31. The oil may flow uninterruptedly, however, into the larger bypass pipe 40 and through the pipe 35 to the oil reservoir 37. The bypass 40 is useful to take care of a sudden rush of a quantity of oil from the turbine and thus the danger of oil spilling on the floor is eliminated. When only filtered oil can be permitted to pass into the reservoir 37 the pipe 35 may be connected to a drain or sump tank but in the system disclosed in Fig. 1 it is preferred to let the oil flow through the connection 36 into the reservoir 37 so as to maintain a predetermined depth of oil in the chamber 5.

When the filtering apparatus 3 is operating at maximum capacity the valve 28 may be fully closed but when the filtering material and elements become gradually clogged the valve 28 may be opened so as to regulate the flow through the pipe 24. If the oil supplied to the filter 3 exceeds the capacity of the latter the alarm mechanism will be operated and if regulation of the valve 28 is not effected immediately the oil will overflow the pipe 40 to prevent oil spilling on the floor. It should be understood, however, that if desired the pipe 31 alone may be relied on when made of sufficient internal diameter to take care of all overflow of oil in the filter 3.

The filtering system may thus be kept in operation continuously and automatically and the efficiency of operation maintained by the alarm mechanism which calls the attendant when regulation of the valve 28 is desirable or when the filtering elements need renewal for most efficient operation.

If the pump 22 fails the oil stays in the chamber 5 of the turbine base 4. If the filter 3 fails the oil will pass on through the large overflow bypass pipe 40 on the side of the filter back into the clean oil chamber 37 and through the pipe 25 back to the chamber 5 in the turbine base. If the filter material or elements overflow the alarm mechanism will be operated to notify the attendant. If the alarm fails to ring the oil will continue to flow back to the turbine base chamber 5 from the pipe 35, connection 36, tank 37 and pipe 25.

The turbine may therefore be kept in operation independently of the filtering system after the latter has been operated for some time because the oil in the base chamber 5 has been freed from water, dirt and impurities. While the pump 22 may be located at various elevations it is preferred to mount it in such position that oil will be supplied to it by gravity from the chamber 5 through the pipe 21. It should be noted that the pipe 21 leads from the chamber 5 to the intake of the pump 22 and the oil is fed to the latter by gravity without any tendency to appreciably lower the depth of the oil in the chamber 5. It is important to maintain a predetermined depth of oil in the chamber 5 to assure continued operation of the regular lubricating system of the turbine.

It is also important to note that no special device is necessary in this system to maintain the oil in the chamber 5 at a predetermined depth. This is by reason of the fact that there is a gravity feed from the tank 37 through the pipe 25 into the chamber 5. While the filter 3 is shown in Fig. 1 on the concrete base 2 it may be located at varying distances from the engine so long as the gravity feed through the pipe 25 is maintained. It can readily be seen that even when there is overflow of oil in the filter it is directed by gravity back to the chamber 5 in the base 4 of the turbine.

The details of the interior construction of the filter 3 of Fig. 1 will be more fully understood by referring to Figs. 2, 3 and 4. The oil to be filtered flows from the pipe 24 into the compartment 84 of the uppermost section 39 and then passes through the filter wall 43 composed of spaced-apart sheets of reticulated metal with the spaces between filled with filtering material, such as animal hair, which when clogged with dirt may be removed and replaced by clean hair. After passing through the filter wall 43 the oil enters the compartment 44 out of which it flows by gravity at 45 into the water separating chamber 46. A sight flow opening may be provided at 47 opposite the nozzle 45. A valve 48 may be provided for the compartment 84. Normally this valve is closed but may be opened when it is desired to clean sediment out of the compartment 84.

In the water separating chamber 46 is located a baffle plate 67 to freely circulate the incoming mixture. A steam heating pipe 49 with exterior connections for circulation of steam is also provided for compartment 84. The water descends and passes through the opening 51 into the exterior box 52 which is open at the top and has a pipe 53 extending up a predetermined distance. This pipe is open at its top and bottom and has an adjustable extension 54 at its upper end and a sight flow device 55 at its lower end.

In the water separating chamber are three vertical oil pipes 56 each open at its upper end and each provided at its upper end with an adjustable extension. These adjustable extensions may be regulated in accordance with the level of the support for the filtering apparatus as a whole. Thus the oil may be caused to flow equally through the three pipes 56, the extension 54 being adjusted at a lower level so that the water will flow through the pipe 53 to waste.

From the pipes 56 the oil flows or drips into the filter elements 58 each consisting of a plurality of nested filter bags suspended from rings 59 the longest of which has an overflow spout in position to deliver oil to the trough 61 when the bags become clogged and should be cleaned or renewed. From the trough 61 the oil flows to the pipe 38 into the pipe 31 and thence to the alarm apparatus. From the filter bags the oil flows into the tank 37. The glass gauge 62 may be used to indicate that oil is properly flowing back to the oil reservoir 5 in the turbine base. A spigot 63 may be used to remove oil from the oil chamber 37 when desired. Oil may be supplied to the system by lifting the lid 64 and pouring it into the compartment 84.

It should be particularly noted that in the upper section 39 an entirely separate compartment 65 is provided. The adjacent compartment 84 is provided with a common partition the upper edge of which is below the top of both compartments 84 and 65. When the filtering material 43 becomes clogged or when the flow of oil from the pipe 24 exceeds the capacity of the filter the compartment 84 will fill up until the oil overflows the edge 66 into the separate compartment 65. The upper end of the pipe 31 communicates with the bottom of the compartment 65 and therefore if the valve 41 is open the oil will first flow down the pipe 31 to operate the alarm mechanism to call the attendant. However, if the chamber 65 fills rapidly the oil will subsequently flow into the large pipe 40. The upper end of the latter is connected to compartment 65 at a substantial distance above the upper end of the pipe 31.

For the purpose of facilitating inspection of the filter bags when the door 69 is open a suitable incandescent lamp may be provided, as shown at 68. A tray 71 is provided in front of the filter chamber above the tank 37 to receive the drip from the filter elements when removed for the purpose of cleaning the same.

The preferred form of alarm mechanism is shown in Fig. 5. When oil flows down the pipe 31 it fills the tray 71 which is pivoted at 72 to the box 73. The oil in the tray tilts the latter so that the arm 74 closes the electric switch 75. A circuit will be closed from one terminal 76 of the dry cell 77 through the wire 78, electric bell 79, wire 80, switch 75, arm 74, metal casings 73 and 81 to the other terminal 82 of the dry cell. The electric bell 79 will continue to ring as long as the overflow continues through the pipe 31. When this overflow ceases, however, the oil in the tray 71 will drain out of the restricted opening 83 into the casing 73. Whatever oil flows into the casing 73 will flow into the pipe 35 and thence into the tank 37 through the pipe 36 which is in communication with pipe sections 40 and 35. When the oil has been drained out of the tray 71 the latter will be automatically moved up or restored to its initial position and this will cause the arm 74 to move down and open the switch 75 thereby interrupting the circuit from the battery through the electric bell. The alarm mechanism will therefore automatically cease its operation and automatically restore itself to normal soon after the overflow of oil ceases, in readiness for another automatic operation when the oil again overflows.

Obviously those skilled in the art may make various changes in the details and arrangement of parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States is:

1. In filtering apparatus, the combination with filtering mechanism, of a reservoir, alarm mechanism adapted to be operated by overflow from said filtering mechanism, an overflow by-pass, and connections between said alarm mechanism and said reservoir and between said by-pass and said reservoir, for conducting overflow to said reservoir.

2. In filtering apparatus, the combination with a filter device comprising an upper receiving chamber and a lower reservoir, of indicating mechanism adapted to be operated by overflow, an overflow compartment associated with said upper receiving chamber, a connection from said compartment to said indicating mechanism, and a manually operated valve for closing the said connection between said compartment and said indicating mechanism.

3. In purifying apparatus, the combination with a filter device comprising an overflow compartment, of overflow indicating mechanism, a pipe connected between the lower portion of said compartment and said indicating mechanism for conducting overflow to said indicating mechanism, and an overflow pipe independent of said first-named pipe and connected to said compartment at a point higher than the connection of said first-named pipe to said compartment for conducting overflow from the overflow compartment in excess of the capacity of the first-named pipe.

4. In purifying apparatus, the combination with an upper preliminary filter, of a lower receiving tank, separating mechanism below said filter, additional filtering mechanism below said separating mechanism, overflow alarm mechanism, and connections for directing overflow from said preliminary filter and from said additional filtering mechanism to said alarm mechanism to operate the latter upon overflow of either said preliminary filter or said additional filtering mechanism.

5. In filtering apparatus, the combination with a filter device comprising an overflow compartment and a receiving tank, of overflow indicating mechanism, an overflow pipe connected between said compartment and said indicating mechanism and means for directing the overflow from said indicating mechanism into said receiving tank.

6. In filtering apparatus, the combination with filtering mechanism, of a tank for receiving from the filtering mechanism, a by-pass around the filtering mechanism and leading into said tank, and indicating mechanism interposed in said by-pass for operation by the liquid flowing through said by-pass.

7. In filtering apparatus, the combination with filtering mechanism, of a receiving tank, overflow indicating mechanism, connections comprising a pipe of relatively small internal diameter for directing overflow to said overflow indicating mechanism, an overflow pipe of relatively large internal diameter, and connections for directing overflow into said tank from said large overflow pipe and from said indicating mechanism.

8. In filtering apparatus, the combination with a filter device comprising an upper filter and a lower receiving tank, of an overflow compartment associated with said upper filter, a connection between said compartment and said tank for conducting overflow to said tank, overflow indicating mechanism interposed in said connection between said compartment and said tank, and an additional connection between said compartment and said tank for directing overflow into the latter independently of the overflow adapted to operate said indicating mechanism.

9. In filtering apparatus, the combination with a filter device comprising an upper overflow compartment and a lower receiving tank, of a connection from the lower portion of said compartment to said tank, overflow indicating mechanism interposed in said connection, and an additional connection between the upper portion of said compartment and said tank to direct overflow into the latter independently of said first-named overflow connection.

10. In a lubricating system, the combination with a source of supply comprising an oil reservoir, of oil purifying apparatus, means for pumping oil from said reservoir into said oil purifying apparatus, means for directing oil from said purifying apparatus into said reservoir, overflow indicating mechanism for said oil purifying apparatus, and means for directing overflow back into the system after operating said indicating mechanism.

11. In an automatic circulating system, the combination with a reservoir, of purifying apparatus, means for drawing from said reservoir and supplying said purfying apparatus, overflow indicating mechanism automatically operable when the capacity of the purifying apparatus is exceeded, means for directing the overflow back into the system after operating said indicating mechanism, and means for directing the overflow from the purifying apparatus to said reservoir.

12. In a lubricating system, the combination with an oil reservoir, of automatic oil purifying apparatus, automatic means for drawing oil from said reservoir to said purifying apparatus, overflow alarm mechanism automatically operable when the capacity of the oil purifying apparatus is exceeded, and means for automatically directing oil from said purifying apparatus to said reservoir.

13. In an automatic lubricating system, the combination with an oil reservoir, of automatic oil purifying apparatus, automatic means for drawing oil from said reservoir and supplying it to said purifying apparatus, automatic means associated with said purifying apparatus for by-passing the oil when the supply exceeds the capacity of said oil purifying apparatus and keeping such by-passed oil in the system to maintain the quantity in the said reservoir at approximately a predetermined amount, and means for directing oil from said purifying apparatus to said reservoir.

14. In a lubricating system for engines, the combination with a reservoir, of an automatic circulating system for drawing oil from said reservoir and after being used returning the oil to said reservoir, oil purifying apparatus, means for drawing oil from said reservoir and after purification returning the oil to said reservoir without interfering with the operation of said automatic circulating system, and automatic mechanism for by-passing overflow in said purifying apparatus and giving an indication of such overflow while maintaining the depth of oil in said reservoir approximately constant.

15. In an automatic lubricating system, the combination with an oil reservoir, of automatic circulating lubricating apparatus connected to said reservoir, automatic circulating oil purifying apparatus connected to said reservoir in parallel with said circulating lubricating apparatus, overflow means associated with said purifying apparatus to prevent spilling of the oil and maintain the same in the system to assure the maintainance of the oil in said reservoir at an approximate predetermined depth, and indicating mechanism associated with said overflow means.

16. In a lubricating system for engines, the combination with an oil reservoir, of circulating lubricating apparatus for drawing oil from said reservoir and returning used oil thereto, oil purifying apparatus, means for automatically drawing oil from said reservoir and supplying it to said purifying apparatus, overflow indicating mechanism, means for automatically operating said indicating mechanism by overflow, a by-pass for receiving excess of supply to said oil purifying apparatus, means for maintaining overflow and excess supply in the system, and means for automatically directing oil from said purifying apparatus to said reservoir while the depth in the latter is maintained approximately constant.

In testimony whereof I have signed my name to this specification on this 8th day of July, A. D. 1924.

WILLIAM W. NUGENT.